(12) United States Patent
Odell et al.

(10) Patent No.: US 8,069,032 B2
(45) Date of Patent: Nov. 29, 2011

(54) LIGHTWEIGHT WINDOWING METHOD FOR SCREENING HARVESTED DATA FOR NOVELTY

(75) Inventors: Julian J. Odell, Kirkland, WA (US); Kunal Mukerjee, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1268 days.

(21) Appl. No.: 11/494,301

(22) Filed: Jul. 27, 2006

(65) Prior Publication Data
US 2008/0027706 A1 Jan. 31, 2008

(51) Int. Cl.
*G06F 17/27* (2006.01)
(52) U.S. Cl. ............ 704/9; 704/7; 704/8; 704/10
(58) Field of Classification Search ............ 704/7–9, 704/251–256.2
See application file for complete search history.

(56) References Cited

U.S. PATENT DOCUMENTS

| | | | |
|---|---|---|---|
| 5,899,973 A * | 5/1999 | Bandara et al. ............ 704/256.2 |
| 6,167,398 A | 12/2000 | Wyard et al. ............ 707/5 |
| 6,278,968 B1 | 8/2001 | Franz et al. ............ 704/3 |
| 6,345,249 B1 * | 2/2002 | Ortega et al. ............ 704/244 |
| 6,418,431 B1 | 7/2002 | Mahajan et al. ............ 707/4 |
| 6,442,519 B1 | 8/2002 | Kanevsky et al. ............ 704/243 |
| 6,484,136 B1 * | 11/2002 | Kanevsky et al. ............ 704/9 |
| 6,778,995 B1 | 8/2004 | Gallivan ............ 707/102 |
| 6,928,404 B1 | 8/2005 | Gopalakrishnan et al. ..... 704/10 |
| 6,947,933 B2 | 9/2005 | Smolsky ............ 707/6 |
| 6,983,247 B2 | 1/2006 | Ringger et al. ............ 704/251 |
| 6,990,628 B1 | 1/2006 | Palmer et al. ............ 715/234 |
| 2001/0051868 A1 * | 12/2001 | Witschel ............ 704/9 |
| 2002/0188446 A1 * | 12/2002 | Gao et al. ............ 704/240 |
| 2003/0088410 A1 | 5/2003 | Geidl et al. ............ 704/235 |
| 2003/0144837 A1 * | 7/2003 | Basson et al. ............ 704/231 |
| 2005/0165598 A1 | 7/2005 | Cote et al. ............ 704/1 |
| 2006/0100876 A1 * | 5/2006 | Nishizaki et al. ............ 704/257 |
| 2007/0150278 A1 * | 6/2007 | Bates et al. ............ 704/257 |

OTHER PUBLICATIONS

Fabio Brugnara, "Techniques for approximating a trigram language model", paper appeared in "Spoken language", 1996, http://ieeexplore.ieee.org/xpl/abs_free.jsp?arNumber=607210, (4 pgs).
IEEE Xplore, "Techniques for approximating a trigram language model"—this is documentation showing the date of the document cited. http://ieeexplore.ieee.org/xpl/absprintf.jsp?arnumber=607210&page=FREE, (1 pg).

(Continued)

*Primary Examiner* — Leonard Saint Cyr
(74) *Attorney, Agent, or Firm* — Merchant & Gould (57) ABSTRACT

Biasing of language model customization due to repetitious data is substantially reduced by introducing novelty screening to data harvesting process. Novelty detection based filtering is added to ensure that an adaptation system gives more weight to representative adaptation data that is not repetitious. The value of the adaptation data is preserved and the process prevented from being polluted when the same data is seen multiple times, such as the original posting in an email thread, various versions of the same document, and the like. The screening technique may be built on top of existing data harvesting mechanisms as already seen data is used to determine the novelty of a particular portion of the data. A window into the new data, fixed or variable size, is compared against the already collected data to determine the likelihood that the data is novel.

14 Claims, 5 Drawing Sheets

OTHER PUBLICATIONS

Ronald Rosenfeld, "A Maximum Entropy Approach to Adaptive Statistical Language Modeling", paper appeared in "Spoken language", May 21, 1996, http://www.cs.cmu.edu/afs/cs.cmu.edu/user/roni/WWW/papers/me-csl-revised.pdf, (37 pgs).

Marcello Federico, "Bayesian estimation methods for n-gram language model adaptation", paper appeared in Spoken language, 1996, http://ieeexplore.ieee.org/xpl/abs_free.jsp?arNumber=607087, (4 pgs).

IEEE Xplore, "Bayesian estimation methods for n-gram language model adaptation"—this is documentation showing the date of the document cited. http://www.ieee.org/xpl/absprintf.jsp?arnumber=607087&page=FREE, (1 pg).

Brugnara, Fabio; Federico, Marcello; "Techniques for Approximating A Trigram Language Model," Istituto per la Ricerca Scientifica e Tecnologica, I-38050 Povo, Trento, Italy, pp. 2075-2078.

Rosenfeld; Ronald, "A Maximum Entrophy Approach to Adaptive Statistical Language Modeling," Computer Science Department, Carnegie Mellon University, Pittsburg, PA, May 21, 1996, pp. 1-37.

Federico, Marcello, "Bayesian Estimation Methods for N-Gram Language Model Adaptation," Istituto per la Ricerca Scientifica e Tecnologica, I-38050 Povo, Trento, Italy, pp. 240-243.

\* cited by examiner

LIGHTWEIGHT WINDOWING METHOD FOR SCREENING HARVESTED DATA FOR NOVELTY

BACKGROUND

Many technologies benefit from adaptation to a user's particular linguistic style. For example, spell checkers, spam filters, acoustic and language models for speech recognizers, and the like, utilize adaptation techniques to optimize their efficiency and accuracy. Harvesting pre-existing documents and files provides one potential source of data that can be used to learn about the user's linguistic style.

However, typical adaptation techniques perform well only when the used data is representative of the user's linguistic style. The available documents and files may frequently contain repeated content such as multiple versions of the same document or mail threads with many replies to the same initial email. Often, it may be difficult to keep track of which documents or data have already been processed by the adaptation system in order to determine the relevance of a new file or document. For example, when the data includes a long mail thread, the multiple replies may repeat the original posting many times. Adapting directly from such data may unduly bias the personalized model to repeated data rather than to a more representative spectrum of data.

In many ways, documents that have multiple versions are more likely not to be the product of a particular user but instead the product of a group of people and therefore not as representative of the user's linguistic style as a document that only occurs once. This leaves an adaptation system vulnerable to two errors. The system may learn patterns of language from other users with as much weight as the targeted user, and it may learn biased frequencies as it sees the same data "too many" times.

An example of linguistic style adaptation is speech recognition systems. Many current speech recognition systems use language models which are statistical in nature. Such language models are typically generated using known techniques based on a large amount of textual training data which is presented to a language model generator. An N-gram language model may use, for instance, known statistical techniques such as Katz's technique, or the binomial posterior distribution back-off technique. In using these techniques, the language models estimate the probability that a word $w(n)$ will follow a sequence of words $w1, w2, \ldots w(n-1)$. These probability values collectively form the N-gram language model. There are many known methods which can be used to estimate these probability values from a large text corpus presented to the language model generator. When such large text corpora are used, unintentional biasing due to repeated data may skew the adapted language model.

It is with respect to these and other considerations that the present invention has been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to filtering data passed to an adaptation system to determine if the data is novel and, thereby, worthy of adaptation. The adaptation system itself is used to determine the novelty of the data to provide a lightweight and efficient method of tracking data without dealing with metadata of documents or files containing the data. According to some embodiments, a window into new data may be matched against already seen adaptation data statistics to determine a likelihood that the data is novel.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Document harvesting enables customization and fine-tuning of language models for individual users of a system, so that speech recognition works better for the individual users and their specific vocabularies. As briefly described above, an adaptation system using document harvesting may be enhanced by adding filtering to ensure that the system gives more weight to representative adaptation data and less weight to repeated data. The filtering technique may be built on top of existing data collection mechanisms as already seen data is used to determine novelty of a particular portion of data. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

Figure 1:
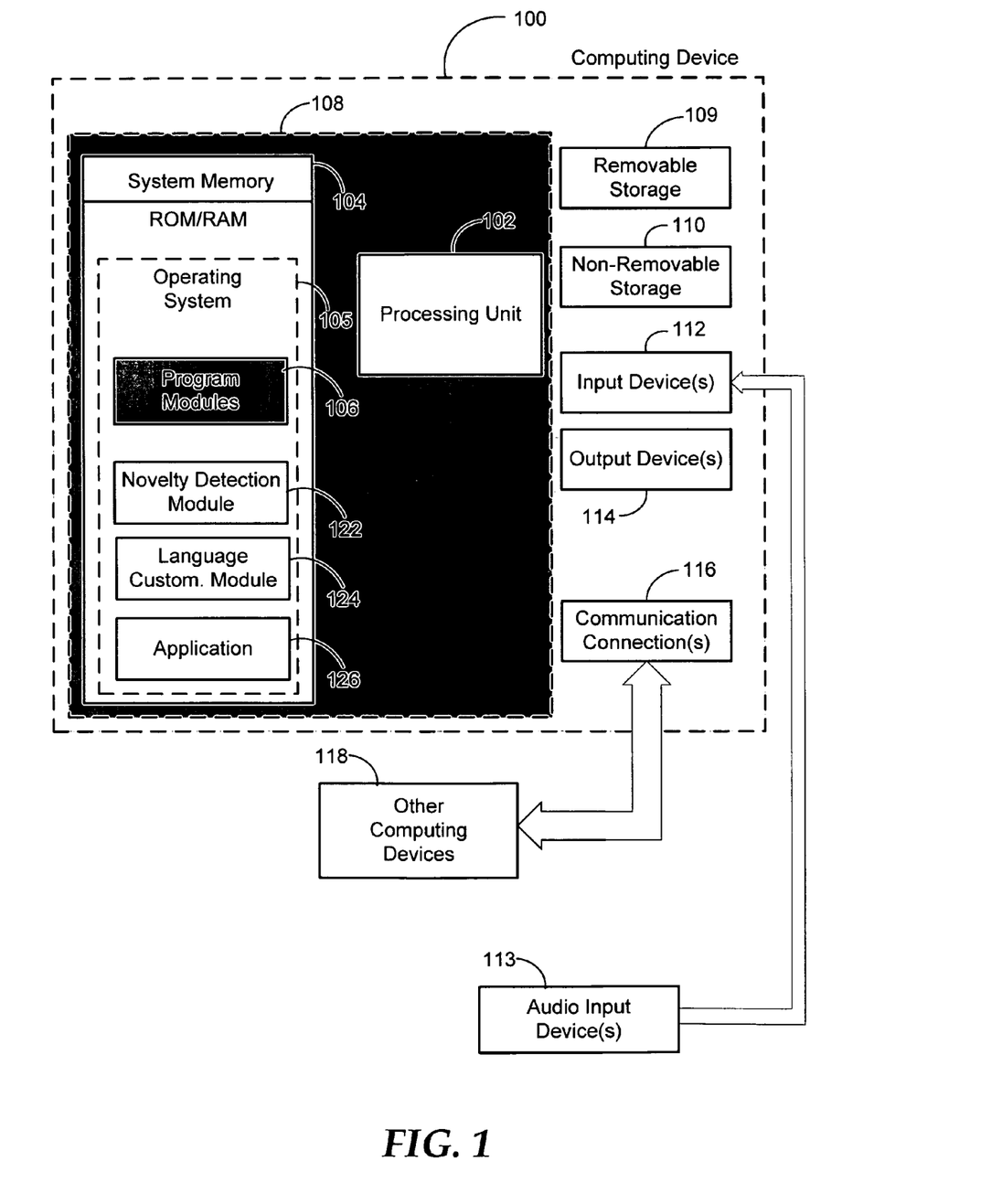
FIG. 1 is a block diagram of an example computing operating environment.

Referring now to the drawings, aspects and an exemplary operating environment will be described. FIG. 1 and the following discussion are intended to provide a brief, general description of a suitable computing environment in which the invention may be implemented. While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

With reference to FIG. 1, one example system for implementing the embodiments includes a computing device, such as computing device 100. In a basic configuration, the computing device 100 typically includes at least one processing unit 102 and system memory 104. Computing device 100 may include a plurality of processing units that cooperate in executing programs. Depending on the exact configuration and type of computing device, the system memory 104 may be volatile (such as RAM), non-volatile (such as ROM, flash memory, etc.) or some combination of the two. System memory 104 typically includes an operating system 105 suitable for controlling the operation of a networked personal computer, such as the WINDOWS® operating systems from MICROSOFT CORPORATION of Redmond, Wash. The system memory 104 may also include one or more software applications such as program modules 106, novelty detection module 122, language customization module 124, and application 126.

One of the challenges in document harvesting ensuring that the data is a relevant and biasing due to lack of balanced cross section of the type of data likely to be used by the user is avoided. By adding novelty filtering to an adaptation system is directed to give more weight to representative adaptation data (and less weight to data that is not representative). This prevents the system from being polluted when the same document is seen many times.

Novelty detection module 122, language customization module 124, and application 126 may work in a coordinated manner as part of an adaptation system such as a speech recognition system, a spam filtering system, a text prediction system, and the like. As described below in more detail, novelty detection module 122 may provide filtering of harvested data to reduce repetitious data, and language customization module 124 may adapt a generic language model based on the filtered, harvested data. Application 126 may be any program that consumes the customized language model such as a spell checker. Novelty detection module 122 and language customization module 124 may be an integrated part of application 126 or separate applications. Novelty detection module 122, language customization module 124, and application 126 may communicate between themselves and with other applications running on computing device 100 or on other devices. Furthermore, either one of novelty detection module 122, language customization module 124, and application 126 may be executed in an operating system other than operating system 105. This basic configuration is illustrated in FIG. 1 by those components within dashed line 108.

The computing device 100 may have additional features or functionality. For example, the computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

Furthermore, input devices 112 may receive input from other input devices such as audio input devices 113 in some specific implementations. For example, novelty screening of harvested data may be implemented in a speech recognition system, which may receive training data from microphones directly connected to the computing device 100 or from recording devices that provide pre-recorded audio data.

The computing device 100 may also contain communication connections 116 that allow the device to communicate with other computing devices 118, such as over a network in a distributed computing environment, for example, an intranet or the Internet. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
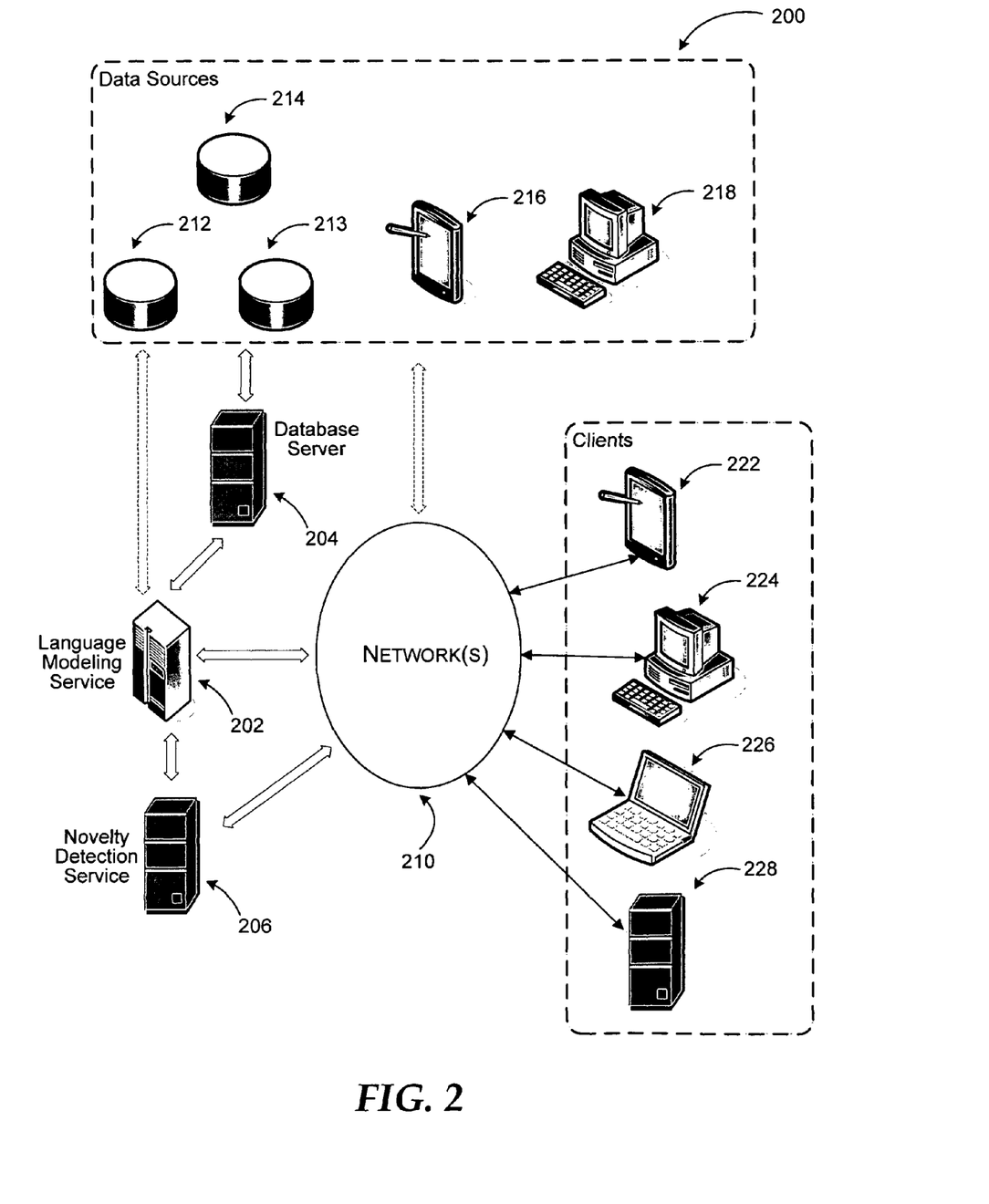
FIG. 2 illustrates a networked system where example embodiments may be implemented.

Referring to FIG. 2, a networked system where example embodiments may be implemented, is illustrated. System 200 may comprise any topology of servers, clients, Internet service providers, and communication media. Also, system 200 may have a static or dynamic topology. The term "client" may refer to a client application or a client device employed by a user to perform operations associated with an adaptation system. While the adaptation system may include many more components, relevant ones are discussed in conjunction with this figure.

Language modeling service 202, database server 204, and novelty detection service 206 may also be one or more programs or a server machine executing programs associated with the adaptation system tasks. Similarly, data sources may include one or more data stores, input devices, and the like.

An adaptation system may be run on a server or a client machine connected to network(s) 210 and use language modeling service 202 to customize a language model. Language modeling service 202 may receive a generic language model and data for customizing the language model from data sources 212-214, 216, and 218 directly or through database server 204. The data sources may include data stores where generic language models and other customization data may be stored or user devices for providing direct input such as audio training data in speech recognition system. As such, data sources may also encompass client devices 222-228 for providing input to language modeling service 202. Data sources may include SQL servers, databases, non multi-dimensional data sources, file compilations, data cubes, and the like. Database server 204 may manage the data sources.

Novelty detection service 206 may provide a filtering service for harvested data by the language modeling service 202. By adding novelty filtering to ensure that the adaptation system gives most weight to representative adaptation data (and less weight to data that is not representative), readaptation of the same material multiple times can be avoided. This preserves the value of the adaptation and prevents it from being polluted when the same document is seen many times, such as the original posting in an email thread, a document undergoing review and update, and the like.

Users may interact with language modeling service 202 from client devices 222, 224, 226, and 228 over network(s) 210. Users may run applications that consume the customized language model provided by language modeling service 202 in the individual client devices (or applications), provide input for language model customization, and the like.

Network(s) 210 may include a secure network such as an enterprise network, or an unsecure network such as a wireless open network. Network(s) 210 provide communication between the nodes described above. By way of example, and not limitation, network(s) 210 may include wired media such as a wired network or direct-wired connection, and wireless media such as acoustic, RF, infrared and other wireless media.

Many other configurations of computing devices, applications, data sources, data distribution and analysis systems may be employed to implement an adaptation system with data novelty screening.

Figure 3:
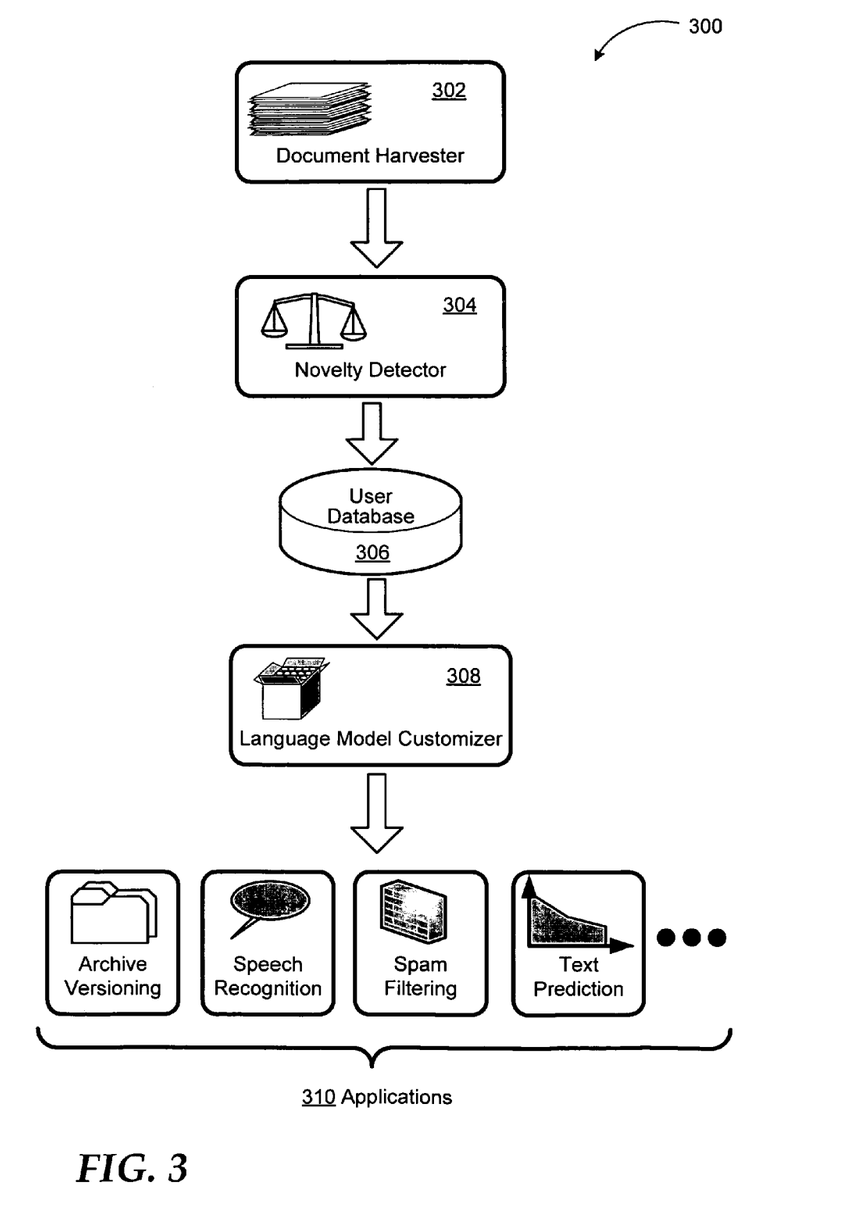
FIG. 3 illustrates an example adaptation system architecture according to embodiments.

Now referring to FIG. 3, example adaptation system architecture 300 is illustrated. Adaptation system architecture 300 may comprise any topology of processing systems, storage systems, source systems, and configuration systems. Adaptation system architecture 300 may also have a static or dynamic topology.

Document harvester 302 is a component of the adaptation system that determines and provides data relevant to customizing the language model. For example, document harvester 302 may be an indexing system, which forms part of a search system. The indexing system can be used to provide a speech recognition engine or a spell checker engine with a list of documents present on the user's machine to be used for customizing the language model used by either engine. Once the user chooses to activate document harvesting, the indexer may pass lists of documents (including electronic mail messages) as it processes them for the speech or spell checker engines to scan the documents and learn about the particular words and word sequences frequently used by the user.

Novelty detector 304, according to some embodiments, is configured to filter the raw data coming from the harvested documents to determine whether a particular document (or fragment of a document) is truly novel or just a repetition of data already processed. This way, only novel data is used to adapt the user's language model.

A common language modeling system is an "N-Gram" that conditions the probability of each word based on the previous word (N−1). The actual number of "gram's" used in windowing the textual data may be selected based on a trade off between accuracy and processing power. For example, many language modelers use a trigram model where the probability of a particular word is conditioned based on the previous two word history.

One way to adapt the language model to a particular user is to use their data to create a user trigram model. This user trigram model can then be combined with the standard trigram language model to produce an adapted model. Interpolation of probabilities may be used for combining the standard and the user models. The user trigram model may be created by accumulating statistics about how many times each distinct word triple is seen in the harvested adaptation data. Hence, novelty detector 304 may accumulate statistics for user documents (or raw data) to create the user trigram model.

The N-grams (e.g. trigrams) from the novel data or selected words may then be stored in a user database 306 for use by the language model customizer 308. Language model customizer 308 may be another program or program module that is arranged to modify a generic language model and adapt it to a particular user's profile. For example, in a spell checker application, language model customizer 308 may add words or phrases frequently used by the user that are not necessarily part of a generic dictionary. In a spam filtering application, the language model customizer 308 may modify a generic model that provides a list of words to be used for detecting spam emails in order to avoid filtering of messages desired by the user.

Language model customizer 308 may then provide the custom language model to one of the applications 310 to be consumed. Applications 310 may include any application that makes use of a custom language model such as an archive versioning application, a speech recognition application, a spam filtering application, a text prediction application, and the like.

Components of the adaptation system such as novelty detector engine 304 may be loaded into a server, executed over a distributed network, executed in a client device, and the like. Furthermore, the components described above are for illustration purposes only, and do not constitute a limitation on the embodiments. An adaptation system with novelty screening may be implemented using fewer or additional components in various orders. Individual components may be separate applications, or part of a single application. The adaptation system or its components may include individually or collectively a user interface such as a web service, a Graphical User Interface (GUI), and the like. Moreover, the harvested data to be used in detecting novelty and generating custom language model is not limited to words, phrases, or letters stored in documents. Raw data, textual or otherwise, such as bit streams, audio recordings, and the like, may also be used to detect novelty.

Figure 4:
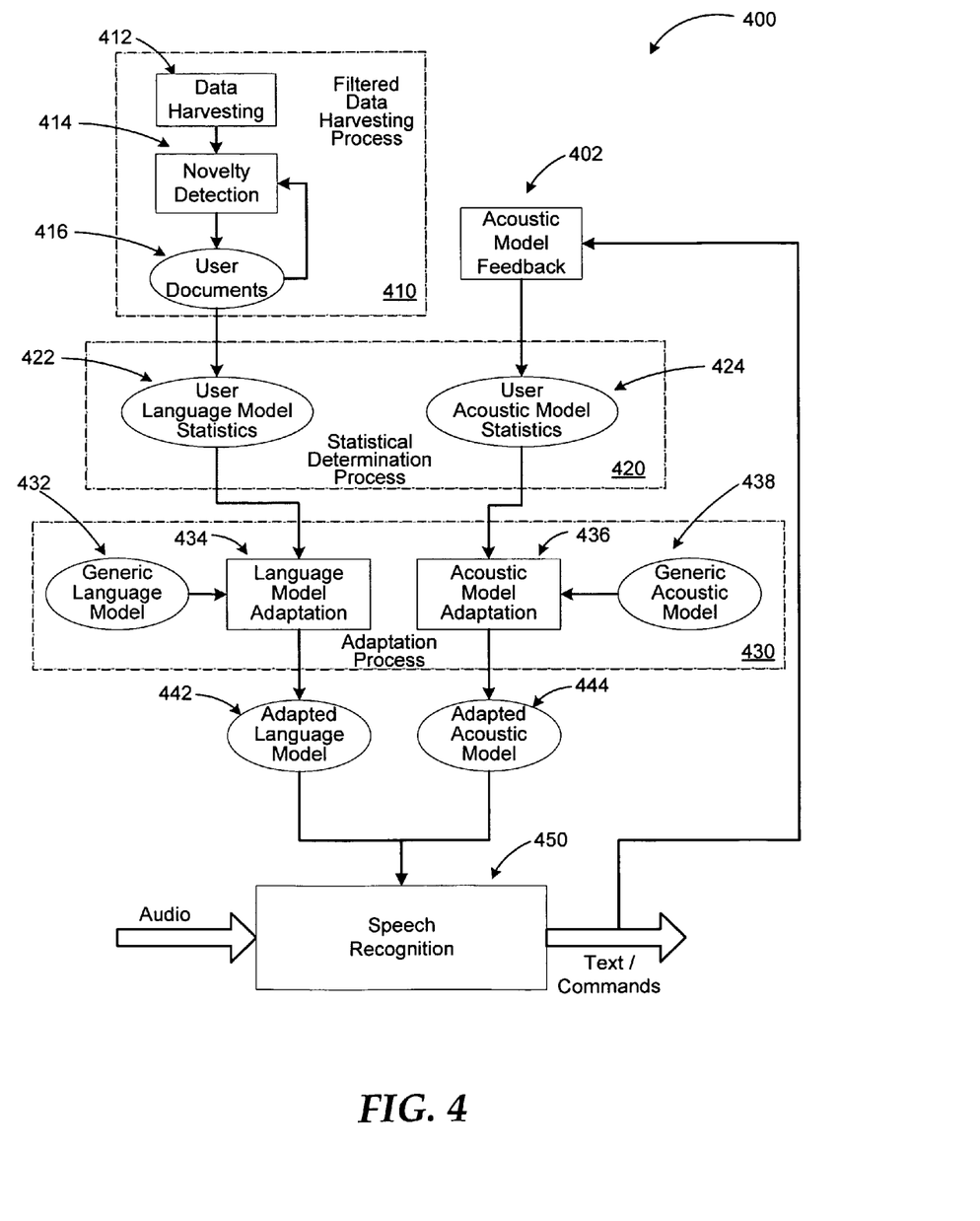
FIG. 4 illustrates a conceptual diagram of processes and sub-processes of an implementation of a novelty screening method according to embodiments in a speech recognition system.

FIG. 4 illustrates a conceptual diagram of processes and sub-processes of an implementation of a novelty screening method according to embodiments in a speech recognition system. Speech recognition systems rely on a number of statistical models to capture information about speech. Often, the models are adapted for a particular user allowing the system to capture the user's speaking style and vocabulary. Textual data is often available (e.g. the user's archived e-mails, stored documents, and the like) to be used by the speech recognition application to learn about the words the user tends to use and the way they tend to use them. As mentioned previously, statistical language modeling techniques such as trigrams may be used to create a custom model.

One of the challenges in collecting user specific data is making sure that the data is a relevant and a balanced cross section of the type of data likely to be dictated by the user.

When the same text appears multiple times, it can lead to the language model overestimating the probabilities of the word sequences contained in the text at the expense of other. Embodiments are directed to reducing this unintentional biasing of the language model.

A speech recognition system may need counts for individual word triples in order to estimate a trigram model. This raw data may then be normalized and smoothed to build a model dependent on the user's adaptation data. According to some embodiments, a window of triples may be examined, while processing the word triples, to determine the likelihood that the data is novel and has not already been incorporated in the model. If any one of the word triples present in the window has not already been seen in the collected adaptation data, then it can be assumed that the window of text has not been seen before.

A size of the window controls a trade off between readapting based on substantially the same text (for example, a paragraph where a single word has been changed) and rejecting new text that just happens to contain the same phrasing as some existing document. For instance, a test window of size 5 may reject 7% of unseen data while accepting a 4 word phrase that had been seen before. Another window size of 10 may reject 2% of unseen data while readapting on a 9 word phrase that was identical to previously seen data.

According to other embodiments, a data store that is eventually used to build the user language model (e.g. the counts of word triples) may be used to determine the novelty of the incoming data. Before the counts of triples are incremented, the window may be examined to determine if the data in the window appears new. If the data is novel, the standard adaptation may continue. On the other hand, the data may be discarded or deweighted (given a lesser weight) if the data appears to be a duplicate or closely related to already seen data.

Two example pieces of pseudo-code are presented below. The first example is for an adaptation algorithm without running a novelty detection test.

```
For each word triple in the incoming data
    Look up the triple in the data store
    If not present
        Add the triple to the data store
    Increment the count for the triple
```

The second example is the original algorithm with novelty detection feature.

```
For each window in the incoming data
    Initialize the unique count to zero
    For each triple present in the window
        Look up the triple in the data store
        If not present
            Increment the unique count
    If the unique count is greater than zero
        For each triple in the window
            Increment the count for the triples in the user
data store
```

As can be seen in the example algorithm, the novelty detection is being performed as the data is harvested. Thus, processing is not overburdened with a separate novelty detection action that re-processes the harvested data. It should be noted that a novelty detection algorithm according to embodiments can use either a sliding window (that advances by just one triple each step and increments a single triple count each step) or a jumping window (that advances and increments multiple triples each step).

Using an algorithm according to embodiments such as the one shown above, the number of novel trigrams in an incoming data window is counted up. If this number falls below a certain threshold, the entire window is discarded and the window slid to further down the textual data. If the number is above the threshold, then the system learns the new trigrams and also increments the count and/or weight of the known ones in the user database. The algorithm used may be a sliding window algorithm. Thus, even if a word is not adapted with reference to the left context, the same word might be adapted with reference to the middle or right context.

Referring to FIG. 4, filtered data harvesting process 410 begins with data harvesting. As previously mentioned, the harvested data may include documents, files, data stream, and the like. Novelty detection process 414 may be executed on the harvested data as described above resulting in the user-specific data being stored in user documents 416. Stored data from user documents 416 is also used by novelty detection process 414 to check against incoming data. As part of creating adapted language model 442, user language model statistics are determined in the statistical determination process 420. Any statistical modeling including, but not limited to, trigrams may be used in statistically identifying words, phrases, fragments, etc. that form the user's profile. The statistical data from user language model statistics 422 and generic language model 432 are used in language model adaptation 434 to create adapted language model 442, which is customized for the particular user's profile.

A second branch of adaptation in speech recognition begins with acoustic model feedback 402, which typically includes live or stored audio recording by the user. The acoustic model feedback 402 is provided to user acoustic model statistics 424 as part of the statistical determination process 420. The resulting statistics data is provided to acoustic model adaptation 436, which customizes generic acoustic model 438 based on the statistics data as part of the adaptation process 430. The resulting adapted acoustic model 444 is provided along with the adapted language model 442 to speech recognition engine (application) 450.

Speech recognition engine 450 receives audio input and provides textual data including raw text or commands using the adapted language and acoustic models. The output textual data may be used for feedback in the acoustic as well as (not shown) language model adaptation processes.

Implementing a lightweight windowing method for screening harvested data for novelty obviates the need to track document revisions or store any knowledge of the source of the incoming data in order to filter out the new parts from the data. An algorithm according to embodiments determines novelty by simply processing the raw data itself, with the existing language model as the frame of reference. Such a raw data-centric approach may be generalized in other application areas, which need to know explicitly what changed, e.g. daily delta tracking in file backup/restore systems.

According to yet other embodiments, a lightweight windowing method for screening harvested data for novelty may be utilized in detecting non-novel data, such as plagiarized text.

The adaptation and novelty detection processes, components, and architecture discussed in FIGS. 3 and 4 are for illustration purposes only. Embodiments are not limited to the example applications, modules, or processes. Adapting language models using novelty detection in harvested data may be provided in many other ways using the principles described herein.

Figure 5:
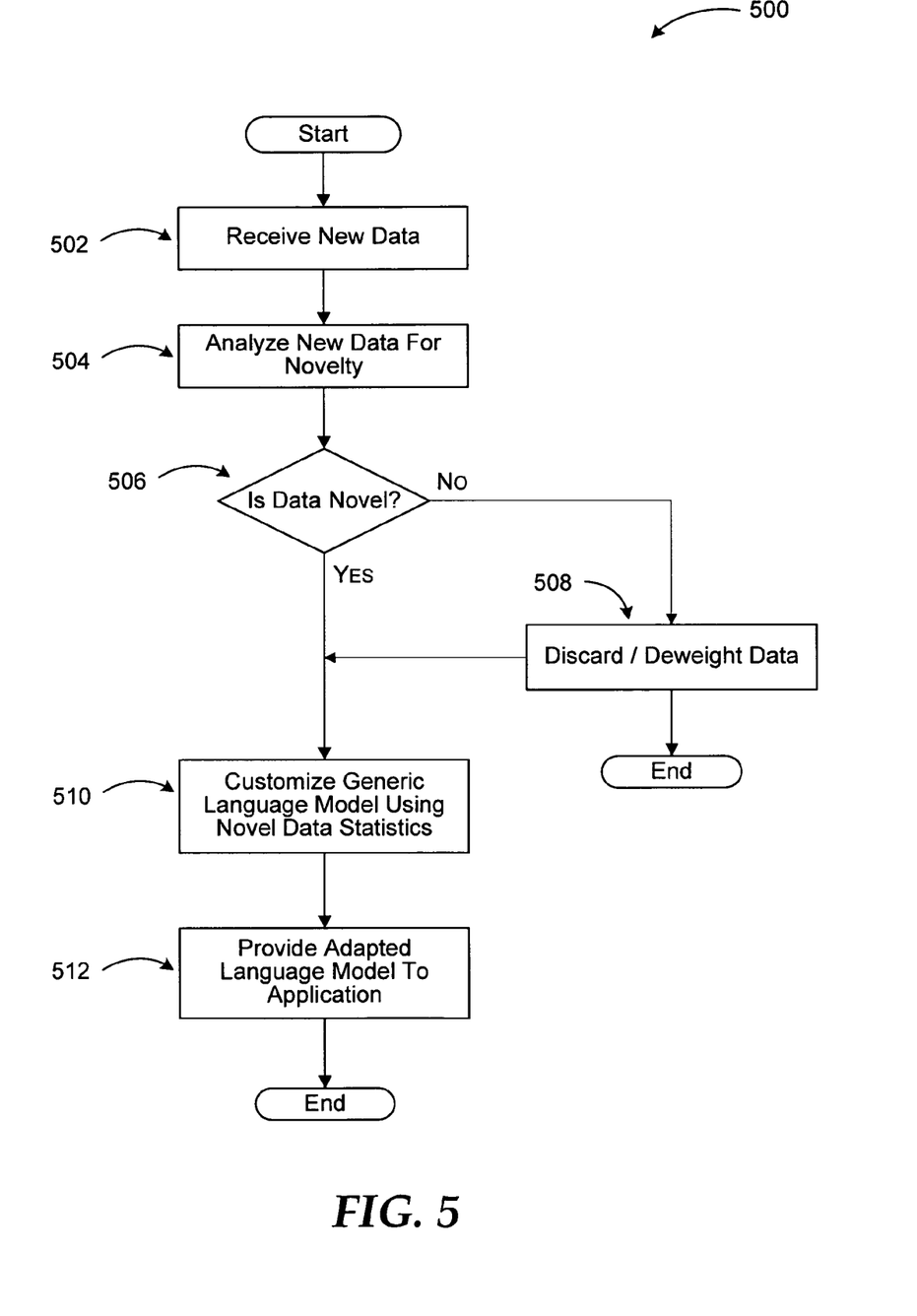
FIG. 5 illustrates a logic flow diagram for a process of using novelty screening in an adaptation system.

FIG. 5 illustrates a logic flow diagram for process 500 of using novelty screening in an adaptation system. Process 500 may be implemented in an adaptation system such as the adaptation systems as described in FIGS. 1 and 2.

Process 500 begins with operation 502, where new data is received for the adaptation process. The new data may be received through a harvesting process such as indexing of documents in a data store, an electronic mail folder, and the like. In some embodiments, the new data may be a data stream from an audio recording or similar source. Processing advances from operation 502 to optional operation 504.

At operation 504, the received data is analyzed for novelty. A novelty detection engine may utilize a statistical analysis method such as trigram windowing that is already being used for data harvesting, and compare the new data to existing data incorporated to the language model. According to some embodiments, a window into the adaptation data may be matched against already seen adaptation data statistics to determine a likelihood that the data is novel. In the example of the trigram windowing, if any one of the word triples present in the window has not already been seen in the collected adaptation data, the new data is assumed to be novel. Processing moves from operation 504 to decision operation 506.

At decision operation 506, a determination is made whether the data is novel. If the data is found to be similar to existing adaptation data, processing moves to operation 508 where the new data is either discarded or given a lesser weight depending on a configuration of the adaptation system. If the data is deweighted (given a lesser weight), processing continues to operation 508 with the data assigned the lesser weight. If the data is discarded, processing may return to operation 502 or continue to a calling process for further actions.

If the data is found to be novel at decision operation 506, processing advances to operation 510. At operation 510, a generic language model is customized for a particular user's profile using the novel data statistics. A number of language modeling techniques known in the art may be used to obtain the adapted language model. Processing moves from operation 510 to operation 512.

At operation 512, the adapted language model is provided to an application that is configured to consume the model. Such applications may include speech recognizers, spell checkers, text predictors, spam filters, archive versioning applications, and the like. Some applications may combine the adapted language model with additional models. For example, a speech recognizer may combine the adapted language model with an adapted acoustic model to create a user profile for converting audio input to textual data for a particular user. After operation 512, processing moves to a calling process for further actions.

The operations included in process 500 are for illustration purposes. Detecting novelty of harvested data as part of language model customization in an adaptation process may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for detecting novelty in a language model customization service, comprising:
   receiving, by the computing device, data for customizing a generic language model, wherein receiving the data for customizing the generic language model includes harvesting the data from a data source employing a statistical analysis method;
   determining, by the computing device, using trigram windowing, whether the received data is similar by a predetermined degree to existing data in a language model customization data store, wherein, for at least one window in the received data, the trigram windowing comprises:
      initializing a unique count to zero;
      looking up a triple in the language model customization data store;
      incrementing the unique count when the triple is not present in the language model customization data store; and
      for each triple in the at least one window, incrementing the unique count for triples present in the language model customization data store when the unique count is greater than zero, wherein the at least one window comprises a jumping window, wherein the jumping window advances and increments multiple triples; and
   if, while the data is being harvested from the data source, the received data is determined to be similar to the existing data, performing, by the computing device, each of the following operations: discarding the received data and assigning a lower weight factor to the received data indicating a lack of novelty, wherein determining whether the received data is similar to the existing data includes employing the same statistical analysis method to compare the received data to the existing data, wherein when the at least one window is small, a larger percentage of unseen data is rejected than when the at least one window is large when the received data is determined to be similar to the existing data; and
   if, while the data is being harvested from the data source, the received data is dissimilar to the existing data, adding, by the computing device, the received data to the language model customization data store, wherein the received data comprises novel data.

2. The method of claim 1, further comprising:
   generating an adapted language model based on customizing the generic language model using the data in the language model customization data store.

3. The method of claim 2, further comprising:
   providing the adapted language model to at least one application from a set of: a speech recognition application, a text prediction application, a spell checker application, an archive versioning application, and a spam filtering application.

4. The method of claim 1, wherein the received data includes one of: textual data and audio data.

5. A computer-readable storage medium, wherein the computer-readable storage medium does not consist of a propagated data signal, the computer-readable storage medium having computer executable instructions, which when executed by a computer, will cause the computer to perform a method for reducing biasing of language model customization in a speech recognition application, the method comprising:

selecting textual data to be used in customizing a generic language model using a first statistical analysis method;

comparing the selected data to existing data in a language model customization data store using a second statistical analysis method;

determining, using trigram windowing, whether the selected data is similar by a predetermined degree to the existing data in the language model customization data store, wherein, for at least one window in the selected data, the trigram windowing comprises:

initializing a unique count to zero;

looking up a triple in the language model customization data store;

incrementing the unique count when the triple is not present in the language model customization data store; and for each triple in the at least one window, incrementing the unique count for triples present in the language model customization data store when the unique count is greater than zero, wherein the at least one window comprises a sliding window, wherein the sliding window advances and increments by a single triple; and determining if the selected data is similar to the existing data, by:

discarding the selected data and assigning a lower weight factor to the selected data indicating a a processor, functionally coupled to the memory, the processor being responsive to computer-executable instructions contained in the program code and operative to:

utilize a document harvester configured to select textual data from a plurality of data sources using a statistical analysis method;

utilize a novelty detector configured to:

compare the selected data to existing data in a user data store using the same statistical analysis method;

determine, using trigram windowing, whether the selected data is similar to the existing data in the user data store, wherein, for at least one window in the selected data, the trigram windowing comprises:

initializing a unique count to zero;

looking up a triple in the user data store;

incrementing the unique count when the triple is not present in the user data store; and for each triple in the at least one window, incrementing the unique count for triples present in the user data store when the unique count is greater than zero, wherein the at least one window comprises a jumping window, wherein the jumping window advances and increments multiple triples; and discard the selected data if it is determined, while the data is being harvested from the plurality of data sources, that the received data is similar to the existing data, wherein determining whether the received data is similar to the existing data includes employing the same lack of novelty, wherein determining whether the selected data is similar to the existing data includes employing the same statistical analysis method to compare the selected data to the existing data, wherein when the at least one window is small, a larger percentage of unseen data is rejected than when the at least one window is large when the selected data is determined to be similar to the existing data; and if the selected data is dissimilar to the existing data, adding the selected data to the language model customization data store, wherein the selected data comprises novel data.

6. The computer-readable storage medium of claim 5, wherein the first and the second statistical analysis methods are identical.

7. The computer-readable storage medium of claim 6, wherein the first and the second statistical analysis methods include N-gram windowing.

8. The computer-readable storage medium of claim 5, wherein the instructions further comprise generating an adapted language model based on customizing the generic language model using the data in the language model customization data store.

9. The computer-readable storage medium of claim 8, wherein the instructions further comprise generating a user profile for speech recognition using the adapted language model and an adapted acoustic model that is based on customizing a generic acoustic model using audio feedback.

10. A system for generating an adapted language model, comprising:

a memory for storing executable program code; and statistical analysis method to compare the received data to the existing data, wherein when the at least one window is small, a larger percentage of unseen data is rejected than when the at least one window is large when the received data is determined to be similar to the existing data;

otherwise, if it is determined, while the data is being harvested from the plurality of data sources, that the received data is dissimilar to the existing data, then add the dissimilar selected data to the user data store as novel data; and a language model customizer configured to generate the adapted language model by customizing a generic language model using the data in the user data store.

11. The system of claim 10, wherein the document harvester, the novelty detector, and the language model customizer are one of: individual modules of an integrated application and individual applications of an adaptation system.

12. The system of claim 10, wherein the novelty detector is further configured to analyze at least one from a set of: phrases, words, word fragments, and letters in the selected textual data.

13. The system of claim 10, wherein the document harvester is further configured to select textual data by analyzing at least one from a set of: files, documents, and a data stream.

14. The system of claim 10, wherein the language model customizer is further configured to provide the adapted language model to at least one application from a set of: a speech recognition application, a text prediction application, a spell checker application, an archive versioning application, and a spam filtering application.

* * * * *

UNITED STATES PATENT AND TRADEMARK OFFICE
CERTIFICATE OF CORRECTION

PATENT NO. : 8,069,032 B2
APPLICATION NO. : 11/494301
DATED : November 29, 2011
INVENTOR(S) : Julian J. Odell et al.

It is certified that error appears in the above-identified patent and that said Letters Patent is hereby corrected as shown below:

In column 11, line 31-59, in claim 5, below "indicating a" delete "a processor, functionally coupled to the memory, the processor being responsive to computer-executable instructions contained in the program code and operative to:
utilize a document harvester configured to select textual data from a plurality of date sources using a statistical analysis method;
utilize a novelty detector configured to:
  compare the selected data to existing data in a user data store using the same statistical analysis method;
  determine, using trigram windowing, whether the selected data is similar to the existing data in the user data store, wherein, for at least one window in the selected data, the trigram windowing comprises;
   initializing a unique count to zero;
   looking up a triple in the user data store;
   incrementing the unique count when the triple is not present in the user data store; and for each triple in the at feast one window, incrementing the unique count for triples present in the user data store when the unique count is greater than zero, wherein the at least one window comprises a jumping window, wherein the jumping window advances and increments multiple triples; and
discard the selected data if it is determined, while the data is being harvested from the plurality of data sources, that the received data is similar to the existing data, wherein determining whether the received data is similar to the existing data includes employing the same".

In column 12, line 30, in claim 10, below "code; and" insert -- a processor, functionally coupled to the memory, the processor being responsive to computer-executable instructions contained in the program code and operative to:
       utilize a document harvester configured to select textual data from a plurality of data sources using a statistical analysis method;
       utilize a novelty detector configured to:

Signed and Sealed this
Seventh Day of February, 2012

David J. Kappos
*Director of the United States Patent and Trademark Office* compare the selected data to existing data in a user data store using the same statistical analysis method;

determine, using trigram windowing, whether the selected data is similar to the existing data in the user data store, wherein, for at least one window in the selected data, the trigram windowing comprises:

initializing a unique count to zero;

looking up a triple in the user data store;

incrementing the unique count when the triple is not present in the user data store; and for each triple in the at least one window, incrementing the unique count for triples present in the user data store when the unique count is greater than zero, wherein the at least one window comprises a jumping window, wherein the jumping window advances and increments multiple triples; and discard the selected data if it is determined, while the data is being harvested from the plurality of data sources, that the received data is similar to the existing data, wherein determining whether the received data is similar to the existing data includes employing the same --.